United States Patent [19]

Narita et al.

[11] 3,867,256

[45] Feb. 18, 1975

[54] METHOD FOR PRODUCTION OF ALPHA-GALACTOSIDASE BY MICROORGANISM

[75] Inventors: Shigeyoshi Narita, Kitami; Hirosuke Naganishi, Hiroshima; Chikashi Izumi; Akiyoshi Yokouchi, both of Kitami; Masaru Yamada, Tokyo, all of Japan

[73] Assignee: Hokkaido Sugar Co., Ltd., Tokyo, Japan

[22] Filed: Jan. 28, 1974

[21] Appl. No.: 437,536

[52] U.S. Cl. ................................. 195/11, 195/65
[51] Int. Cl. .................................. C12d 13/10
[58] Field of Search ................... 195/65, 66 R, 11

[56] References Cited
UNITED STATES PATENTS 3,795,585  3/1974  Suzuki et al. .................... 195/65

*Primary Examiner*—Lionel M. Shapiro
*Attorney, Agent, or Firm*—Kurt Kelman

[57] ABSTRACT

*Circinella muscae* (Berlese et de Toni) nova typica coreanus (ATCC 20394) is cultured in a prepared medium containing, as inducers, lactose, raffinose and melibiose to produce, chiefly within the mycelia, an enzyme which has high α-galactosidase activity and weak invertase activity. The mycelia now containing the produced enzyme are added to a beet molasses including syrup or juice in the course of beet sugar production, so that the enzyme acts upon the raffinose contained in said beet molasses to decompose it into sucrose and galactose and consequently enhance the overall yield of sucrose.

2 Claims, No Drawings

3,867,256

METHOD FOR PRODUCTION OF ALPHA-GALACTOSIDASE BY MICROORGANISM

BACKGROUND OF THE INVENTION

This invention relates to a method for the production of α-galactosidase by a microorganism. More particularly, the present invention relates to a method for the production of α-galactosidase by use of Circinella Muscae (Berlese et de Toni) nova typica coreanus (ATCC 20394).

α-galactosidase has heretofore been known to be an enzyme capable of hydrolyzing raffinose which is a substance occurring as in beet molasses and tending to obstruct crystallization of sucrose. In the course of beet sugar production, therefore, α-galactosidase is added to the beet molasses including syrup or juice so that the enzyme acts on and hydrolyzes the raffinose contained in the beet molasses into sucrose and galactose and consequently enhance the overall yield of sucrose.

As a mold productive of an enzyme having strong α-galactosidase activity and weak invertase activity, there has heretofore been known *Mortierella vinacea* var. raffinoseutilizer (ATCC 20034) (U.S. Pat. No. 3,647,625). Several molds belonging to the genus of Absidia are also known to produce α-galactosidase. In addition, a few type strains belonging to the genus of Circinella are known to have an ability to produce α-galactosidase to some extent.

SUMMARY OF THE INVENTION:

It is an object of this invention to provide a method for the production of an enzyme having high α-galactosidase activity and weak invertase activity by the use of microorganism belonging to the genus of Circinella, i.e., *Circinella muscae* (Berlese et de Toni) nova typica coreanus (ATCC 20394) (hereinafter referred to as "the mold of the invention"). To accomplish the object described above, the present invention utilizes a newly discovered mold belonging to the genus of Circinella, which heretofore has hardly been recognized to produce α-galactosidase. When this mold is cultured in a medium composed of carbon sources, nitrogen sources and inorganic salts and incorporating, as inducers, lactose, raffinose, melibiose, etc., it produces within the mycelia enzymes having strong α-galactosidase activity and weak invertase activity. The enzyme produced by the mold of the invention has higher α-galactosidase activity than the enzyme produced by any of the heretofore known molds. Therefore, this mold can be used in a smaller amount to produce a fixed amount of α-galactosidase than other molds and permits equally ready treatment even in the case of molasses of the type having a high Brix number.

Other objects and characteristics of the present invention will become apparent from the detailed description of the invention and the preferred embodiments to be given herein below.

DETAILED DESCRIPTION OF THE INVENTION:

It has heretofore been known that *Mortierella vinacea* var. raffinoseutilizer (ATCC 20034) and some of the type strains belonging to the genus of Absidia have the ability to produce α-galactosidase. The present inventors further pursued a search for a mold which produces enzymes characterized by high α-galactosidase activity and weak invertase activity. As a consequence, they have discovered that the mold of the invention belonging to the genus of Circinella, when cultured in a known prepared medium under a prescribed set of conditions, produces chiefly within the mycelia enzymes characterized by exhibiting pronouncedly higher α-galactosidase activity than is obtainable by any of the heretofore known molds and weak invertase activity. The fact that a mold belonging to the genus of Circinella has the ability to produce an α-galactosidase effectively utilizable for commercial purposes has not been known. It, therefore, constitutes an entirely novel knowledge.

The mold of the invention has been isolated from a Korean yeast cake by one of the present inventors. Although the attributes of this mold are well in agreement with those of *Circinella muscae* (Sorokine) Berlese et de Toni described in the report of C. W. Hesseltine and Dorotyh I. Fennel (The genus Circinella, Mycologia Vol. XLVII, No. 2, 193–212, March–April, 1955), a difference is recognized in terms of appearance and color tone of the microorganic flora in the initial stage of culture. In addition, these two molds clearly differ in physiological properties, particularly, α-galactosidase producing ability. As a new type of the species *Circinella muscae*, the mold of the invention has been designated "*Circinella muscae* (Berlese et de Toni) nova typica coreanus." The mycological characteristics of this mold are as follows:

A microscopic observation reveals that the sporangiophores grown on the Synthetic Mucor Agar medium assume a light brown color and produce sympodial branches as they get old. Their forward ends invariably form circinate coils downwardly, with a single sporangium borne at the extremity of each coil. Occasionally, sterile spines branch off near sporangia and they are separated by septa. Main sporangiophores and branched sporangiaphores are slightly different in size from each other, the former measuring 8 to 10 microns and the latter 4 to 6 microns respectively in diameter. Sporangia have a spherical form or a slightly pressed pseudospherical form and measure 30 to 65 microns in diameter. At first, they are white and gradually assume a dark gray color as they mature. They are observed to vary in diameter; small ones measure about 20 microns and large ones are found to reach as much as 80 microns. The wall surfaces of sporangia are slightly coarse and broken and frequently retain dished collars in the lower portion of columella.

Columella measure 10 to 30 by 30 to 40 microns on the average and occur in various forms such as oval, conical, pear-shaped and rectangular form. Some have a smooth surface and others have an indefinite number of protuberances at the top. They assume a light gray color.

Sporangiosphores have a spherical to pseudospherical form with a smooth surface and measure 4 to 6 microns in diameter. They appear practically colorless when they are observed individually. When in the form of a cluster, however, they appear to have a dark gray to black color. Growth of chlamidospores or zygosphores is observed.

Macroscopic observation reveals that the mycelium grown on synthetic mucor agar medium, potato dertrose agar medium and malt extract agar medium at first presents a felt-like appearance which changes in color from white to dark gray or black as the sporangia mature. The top of old cultures is covered by light brown sporangiophores having a dirty appearance. This is caused by growth of the light brown sporangiophores which reach 5 to 7 mm. There is no production of soluble pigment in the medium.

The mold of the invention was accepted by ATCC for deposition on Jan. 7, 1974, with the designation ATCC 20394 assigned.

The mold of the invention produces an enzyme having pronouncedly high α-galactosidase activity and weak invertase activity when it is cultured in a medium of the type comprising carbon sources, nitrogen sources, inorganic salts and enzyme-inducing substances and generally employed for the culture of molds.

Carbon sources usable for this medium are starch, glucose, glycerin, maltose, dextrin, sucrose and invert molasses, for example. Nitrogen sources suitable herein are soybean flour, peanut powder, ground cottonseed, corn steep liquor meat extract, peptone, yeast extract, nitrates and ammonium salts, for example. Inorganic salts include common salt, potassium chloride, magnesium sulfate, manganese sulfate, iron sulfate, phosphates and calcium carbonate, for example. If occasion demands, vitamins may be incorporated in the medium.

As inducers for effective production of α-galactosidase in the mycelia, there are used such well-known substances as lactose, intermediate products thereof, raffinose and melibiose.

The culturing conditions under which the production of α-galactosidase within the mycelia of said mold of the genus of Circinella is effectively induced and the growth of the mold is promoted are similar to those employed generally for the aerobic culture of molds. To be specific, a medium is obtained by adding such inducers as lactose, raffinose, melibiose, etc. to a basal substrate formed of carbon sources, nitrogen sources and inorganic salts. Then, the mold of the genus of Circinella is inoculated to the resulting medium and subjected to shaken culture or aerobic culture for 40 to 72 hours, with the pH value kept in the range between 5 and 8 and the temperature kept at about 30°C.

When the culture is carried out as described above, α-galactosidase is produced in a very high yield within the mycelia. Since the mycelia are in the shape of pellets, they can readily be separated from the culture liquid by filtration. The separated mycelia are washed with water, treated by any of known methods such as centrifugation for removal of water, and preserved.

The pellet-shaped mycelia thus obtained are packed in a column-type reaction tank or horizontal reaction tank. When beet molasses is passed through the tank, the enzyme in the mycelia acts on the raffinose contained in said molasses and hydrolyzes it into sucrose and galactose. In the method of the present invention, the α-galactosidase activity per weight of the enzyme is by far higher than is obtainable with any of the heretofore known molds. Therefore, this method can provide effective treatment for beet molasses of a higher concentration or a larger amount than by conventional methods.

A comparative experiment was conducted: A medium was prepared by dissolving 1.0 percent of lactose, 1.0 percent of glucose, 0.3 percent of $(NH_4)_2SO_4$, 0.5 percent of yeast extract, 0.5 percent of peptone, 0.2 percent of $K_2HPO_4$, 0.05 percent of $MgSO_4 \cdot 7H_2O$, 0.002 percent of $MnSO_4 \cdot 4-6H_2O$ and 0.001 percent of $FeSO_4 \cdot 7H_2O$, adjusting the resultant solution with NaOH to pH 5.8 and thereafter incorporating 0.3 percent of $CaCO_3$. The prepared medium was sterilized. The mold of this invention, *Mortierella vinacea* (ATCC 20034), *Absidia reflexa* van Tieghem (IFO 5874), *Circinella muscae* (Sorokine) Berlese et de Toni (*Circinella sydowi* Lendner) (IFO 4457) and *Circinella muscae* (Sorokine) Berlese et de Toni (C. W. Hesseltine) (IFO 6410) were inoculated in the form of spore suspension, to 200-ml portion of the medium, each in an amount to give a count of $2 \times 10^8$ spores and were shaken cultured at 30°C for 48 hours, with the shaking given at a rate of 132 rpm. The results are shown in Table 1.

Table 1

|  | Dry mycelia (g/100 ml) | α-galactosidase activity | | Invertase activity | |
| --- | --- | --- | --- | --- | --- |
|  |  | Total act. (unit/ml) | Spec. act. (unit/g on dry basis) | Total act. (unit/ml) | Spec. act. (unit/g on dry basis) |
| Mold of the invention | 1.42 | 177,000 | $1246 \times 10^4$ | 63 | 4,437 |
| *Mortierella vinacea* (ATCC 20034) | 1.40 | 33,300 | $238 \times 10^4$ | 263 | 18,750 |
| *Absidia reflexa* (IFO 5874) | 1.41 | 75,000 | $532 \times 10^4$ | 110 | 8,333 |
| *Circinella muscae* (IFO 4457) | 1.41 | 69,000 | $489 \times 10^4$ | 90 | 6,383 |
| *Circinella muscae* (IFO 6410) | 1.36 | 42,000 | $309 \times 10^4$ | 119 | 8,750 |

Referring to the data of the preceding table, the values of α-galactosidase activity are those determined by adding 1 ml of mycelia suspension under test to a mixture of 0.5 ml of 0.06M melibiose and 0.5 ml of 0.1M phosphate buffer solution (pH 5.2) to permit reaction to ensue at 40°C for 2 hours, thereafter heating the reaction mixture in a boiling water bath for 5 minutes to inactivate the enzyme, then adding 1 ml of 1.8% $Ba(OH)_2 \cdot 8H_2O$ and 1 ml of 2% $ZnSO_4 \cdot 7H_2O$ to the reaction solution to deprive the solution of protein, centrifuging the resultant mixture and assaying the resultant protein-free supernatant for glucose content by the glucostat process. In consideration of the fact that the amount of glucose liberated from melibiose and the enzyme concentration are in a proportional relationship up to 1000 μg of glucose, the suspension was diluted in advance so that it would fall in the measuring range satisfying this relationship. The amount of free glucose was multiplied by the number of dilutions. The α-galactosidase activity which liberated 1 μg of glucose under the conditions mentioned above was taken as 1 unit. The values of invertase activity are those determined by adding 1 ml of mycelia suspension to a mixture of 0.5 ml of 0.06M sucrose and 0.5 ml of 0.1M phosphate buffer solution (pH 5.0) to permit reaction to ensue under the same conditions as employed for the determination of α-galactosidase activity, centrifuging the resultant reaction solution to remove protein therefrom and assaying the protein-free supernatant for invert sugar content by the Somogyi-Nelson process. The invertase activity which produced 1 μg of invert sugar under the conditions mentioned above was taken as 1 unit.

The dry mycelial weight was found by drying at 105°C that amount of mycelia which had been grown in 100 ml of culture medium and thereafter weighing the dried mass of mycelia.

The enzymes obtained by the culture of the molds were used to treat beet molasses. The relation between molasses concentration and added amount of enzyme was found to be as shown in Table 2.

14.52g of the enzyme is required in the case of *Mortierella vinacea* (ATCC 20034), whereas 2.77g, or about one fifth of said amount, of the enzyme suffices in the case of the mold of the invention.

As described above, the method of this invention produces an enzyme having pronouncedly high α-galactosidase activity per weight of mycelia. Consequently, the adjustment of concentration in the molasses to be treated can be accomplished more readily and the amount of the enzyme to be added can be reduced proportionally, rendering the operation economical. In addition, the enzyme is weak in invertase activity which tends to induce hydrolysis of sucrose and consequently can be handled easily, making it possible to decrease the size of the reaction vessel to be used. In case where the reaction is effected by using a column packed with the enzyme, the amount of the enzyme to be packed in the column is smaller than is required in the case of the enzyme obtained with other molds. Thus, the beet molasses can be treated more effectively because the resistance offered by the packed enzyme to the passage of molasses is decreased consequently.

Now, preferred embodiments of this invention and comparative examples will be cited herein below. It should be understood that the present invention is not limited to these preferred embodiments.

EXAMPLE 1

In a 20-liter jar fermentor, 15 liters of a medium containing 1 percent of glucose, 0.2 percent of peptone, 0.05 percent of $KH_2PO_4$, 0.05 percent of $MgSO_4 \cdot 7H_2O$ and 1280 ppm of cocoline as an antifoam agent was Table 2

| Molasses (200 g) | | Mold of the invention | *Mortierella vinacea* (ATCC 20034) | *Absidia reflexa* (IFO 5874) |
| Brix | Raffinose | | | |
| --- | --- | --- | --- | --- |
| 20(o) | 3.84(o) | 0.925(o) | 4.840(o) | 2.165(o) |
| 30 | 5.76 | 1.387 | 7.261 | 3.248 |
| 40 | 7.68 | 1.849 | 9.681 | 4.331 |
| 50 | 9.60 | 2.311 | 12.101 | 5.414 |
| 60 | 11.52 | 2.774 | 14.521 | 6.496 |

It is clear from the foregoing tables that effective treatment of a beet molasses of Brix 20° containing 3.84g of raffinose requires $1,152 \times 10^4$ units of α-galactosidase. In the case of *Mortierella vinacea* (ATCC 20034), since the α-galactosidase activity is $238 \times 10^4$ units, 4.84g (dry basis) of the enzyme is required. In the case of *Absidia reflexa* (IFO 5874) which has $532 \times 10^4$ units of α-galactosidase activity, 2.17g (dry basis) of the enzyme is required. By comparison, the mold of the invention has $1,246 \times 10^4$ units of α-galactosidase activity. Therefore, 0.93g of the enzyme will suffice for the purpose. This difference in the amount of enzyme required becomes more conspicuous in proportion to the increase in the Brix number of the beet molasses used. For the treatment of a beet molasses of Brix 60°, placed, adjusted to pH 5.5, and sterilized. The mold of the invention in the form of spore suspension was inoculated to the medium at a rate of $1 \times 10^5$ spores/cc of medium and cultured at 30°C for 19 hours, with the aeration performed at ½ v.v.m. and the agitation at 240 r.p.m. The mycelia consequently propagated were used as the starter. In a 20-liter jar fermentor, a 400-ml portion of this starter was inoculated to 15 liters of a medium having the same composition as that of the medium employed in the preceding experiment and cultured at 30°C, with the aeration performed at ¼ v.v.m. and the agitation at 350 r.p.m., until the residual sugar in the medium (as determined by the Somogyi process) reached 0.1 percent. The total period of this culture was as shown below.

Table 3

| Time of culture | pH | Glucose (g/100 ml) | Dry matter (g/100 ml) | α-galactosidase activity | |
| | | | | Spec. act. (u/g on dry basis) | Total act. (u/ml) |
| --- | --- | --- | --- | --- | --- |
| 0 | 6.4 | — | — | — | 0 |
| 16 | 5.5 | — | — | — | 0 |
| 20 | 6.7 | — | — | — | 23,530 |
| 24 | 6.9 | — | — | — | 54,300 |
| 28 | 6.9 | — | — | — | 81,450 |
| 32 | 6.7 | — | — | — | 132,130 |
| 36 | 6.4 | — | — | — | 153,000 |
| 40 | 6.2 | — | — | — | 177,380 |
| 42 | 6.3 | 0.09 | 1.40 | $1,293 \times 10^4$ | 181,000 |

EXAMPLE 2

Media each containing 1.0 percent of glucose, 0.5 percent of yeast extract, 0.5 percent of peptone, 0.3 percent of $(NH_4)_2SO_4$, 0.2 percent of $KH_2PO_4$, 0.05 percent of $MgSO_4 \cdot 7H_2O$, 0.002 percent of $MnSO_4$, 0.001 percent $FeSO_4$ and 1 percent of a saccharide selected from the group of saccharides listed in Table 4 were prepared and adjusted to pH 5.8. A 100-ml portion of each medium was placed in a 500-ml flask and sterilized. The mold of the invention in the form of spore suspension was inoculated to the medium in each flask in an amount to give a count of $5 \times 10^7$ spores and shaken cultured at 30°C for 72 hours, with the agitation performed at a rate of 136 r.p.m. The results are shown in Table 4.

Table 4

| Saccharide | Residual sugar (g/100 ml) | Dry matter (g/100 ml) | α-galactosidase activity | |
|---|---|---|---|---|
| | | | Total act. (u/ml) | Spec. act. (u/g on dry basis) |
| Galactose | 0.07 | 1.35 | 32,400 | $240 \times 10^4$ |
| Melibiose | 0.06 | 1.37 | 34,000 | $248 \times 10^4$ |
| Lactose | 0.09 | 1.48 | 171,000 | $1,155 \times 10^4$ |
| Raffinose | 0.05 | 1.07 | 39,600 | $370 \times 10^4$ |

EXAMPLE 3

Molasses produced by the Steffen process was diluted with water to 30° Brix and adjusted to pH 5.2 by the addition of sulfuric acid. In 200g of the resultant solution (containing 5.8g of raffinose), the mycelia of the mold of the invention (having a dry weight of 1.39g and 17,300,000 units of α-galactosidase) obtained in Ecample 1 were allowed to react at 50°C for 2 hours 30 minutes while under shaking. At the end of the reaction, the mycelia were separated by filtration and washed with water. The filtrate and the washings were combined. A prescribed volume of this mixture was assayed by paper chromatography for residual raffinose content and increased sucross content. To be more specific, the specimen was developed in a solvent consisting of 6 parts of n-butanol, 4 parts of pyridine and 3 parts of water. The raffinose zone and the sucrose zone consequently formed were cut off, washed out with water, and assayed by the cysteinecarbazole process. It was found that 79% of the original raffinose content had been decomposed and the sucross content had been increased by 2.45g.

EXAMPLE 4

In 200g of molasses of 30° Brix prepared in the same manner as in Example 3, the mycelia of the mold of the invention (having 17,300,000 units of α-galactosidase activity) were allowed to react by the same method as in Example 3. After the reaction, the mycelia were washed with water and the washed mycelia were added to a new supply of diluted molasses and allowed to react. In this manner, the mycelia were used repeatedly in a total of five treatments. The decomposition solutions obtained in all the treatments were assayed for residual raffinose content and for increase in sucrose content. The results are shown in Table 5.

Table 5

| After run No. | Increase in sucrose (g) | Decomposition of raffinose (%) | Remaining α-galactosidase activity (%) |
|---|---|---|---|
| 1 | 2.50 | 79.0 | 91 |
| 2 | 2.60 | 79.5 | 89 |
| 3 | 2.46 | 78.0 | 87 |
| 4 | 2.42 | 77.0 | 86 |
| 5 | 2.45 | 75.8 | 85 |

EXAMPLE 5

Steffen molasses was diluted to 50° Brix and then adjusted to pH 5.2 with sulfuric acid. In 200g of this solution (containing 9.60g of raffinose), the mycelia of the mold of the invention (having a dry weight of 2.31g and 28,800,000 units of α-galactosidase activity) obtained in Example 1 were allowed to react at 50°C for 2 hours 30 minutes. At the end of the reaction, the decomposition solution was assayed for decomposition ratio of raffinose and for increase in sucrose content. The decomposition ratio of raffinose was found to be 57.1% and the increase in sucrose content to be 3.06g respectively.

We claim:

1. A method for the production of α-galactosidase by the use of a microorganism, which comprises culturing the mold of *Circinella muscae* (Berlese et de Toni) nova typica coreanus (ATCC 20394) in a medium containing substances capable of inducing α-galactosidase under conditions permitting formation of α-galactosidase.

2. A method for the hydrolysis of raffinose contained in beet molasses or beet juice, which comprises culturing the mold of *Circinella muscae* (Berlese et de Toni) nova typica coreanus (ATCC 20394) in a medium containing substances capable of inducing α-galactosidase, adding the mold containing the α-galactosidase thus produced to beet molasses or beet juice, and maintaining said beet molasses or beet juice under conditions permitting hydrolysis of raffinose contained in said beet molasses or beet juice.

* * * * *